(12) United States Patent
Enger et al.

(10) Patent No.: US 10,633,156 B2
(45) Date of Patent: Apr. 28, 2020

(54) GROUP LOCK BOX WITH RECESSED DOOR TO CREATE A SLIM PROFILE

(71) Applicant: Brady Worldwide, Inc., Milwaukee, WI (US)

(72) Inventors: Andrew N. Enger, Muskego, WI (US); Gene Gladkov, Muskego, WI (US); Noel Motzing, Eau Claire, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 39 days.

(21) Appl. No.: 16/010,886

(22) Filed: Jun. 18, 2018

(65) Prior Publication Data

US 2019/0382174 A1    Dec. 19, 2019

(51) Int. Cl.
| | | |
|---|---|---|
| *B65D 55/14* | (2006.01) | |
| *E05B 65/52* | (2006.01) | |
| *B65D 25/20* | (2006.01) | |
| *B65D 25/28* | (2006.01) | |
| *E05B 19/00* | (2006.01) | |
| *E05D 7/10* | (2006.01) | |
| *B65D 43/16* | (2006.01) | |

(52) U.S. Cl.
CPC ............ *B65D 55/14* (2013.01); *B65D 25/20* (2013.01); *B65D 25/2858* (2013.01); *B65D 43/167* (2013.01); *E05B 19/0005* (2013.01); *E05B 65/52* (2013.01); *E05D 7/10* (2013.01); *E05Y 2900/602* (2013.01)

(58) Field of Classification Search
CPC ...... B65D 55/14; B65D 25/20; B65D 43/167; B65D 25/2858; E05B 65/52; E05B 19/0005; E05D 7/10; E05Y 2900/602
USPC .................. 70/54–56.63, 159, 164, DIG. 63; 109/59 R, 59 T, 64; 312/215; 220/210
See application file for complete search history.

(56) References Cited

U.S. PATENT DOCUMENTS

| | | | |
|---|---|---|---|
| 1,954,896 A | 4/1934 | Shriver | |
| 3,524,564 A | 8/1970 | Schurman | |
| 4,282,974 A * | 8/1981 | Quandel | B65D 7/045 206/509 |
| 4,474,116 A * | 10/1984 | Castenada, Jr. | A45C 13/20 109/50 |
| 4,523,692 A * | 6/1985 | Lemkin | B65D 21/0219 206/508 |
| 5,000,494 A | 3/1991 | Guibleo | |
| 5,195,644 A | 3/1993 | Schmid | |

(Continued)

OTHER PUBLICATIONS

PCT International Search Report and Written Opinion, PCT/US2019/025114, dated Jun. 19, 2019, 19 pages.

(Continued)

*Primary Examiner* — Lloyd A Gall
(74) *Attorney, Agent, or Firm* — Quarles & Brady LLP

(57) ABSTRACT

A group lock box includes a box body and a door in which the door is shaped to have a recess that extends into an internal volume of the box body. The recess permits unique user locks that secure the door to the body to be partially received in the recess, which can make the locks not project as much from the outside of the box, thereby placing the locks closer to the center of gravity of the box. Among other things, this can make carrying the box with locks attached less unwieldy and can slim the overall profile of the group lock box with locks attached.

19 Claims, 6 Drawing Sheets

(56) References Cited

U.S. PATENT DOCUMENTS

| | | | | |
|---|---|---|---|---|
| 5,415,058 | A | * | 5/1995 | Young ............... B60R 25/00 280/507 |
| 5,816,076 | A | * | 10/1998 | Biedermann ....... E05B 73/0082 70/57 |
| 7,175,071 | B1 | | 2/2007 | Slagle et al. |
| 9,016,095 | B2 | * | 4/2015 | Dudgeon ................ E05G 1/08 109/53 |
| 10,207,847 | B2 | * | 2/2019 | Hollis ................ B65D 43/165 |
| 2003/0205396 | A1 | | 11/2003 | Rumsey et al. |
| 2005/0199628 | A1 | * | 9/2005 | Van Handel ........... A47G 29/10 220/315 |
| 2006/0162403 | A1 | * | 7/2006 | Handel ............. A45C 13/1084 70/63 |
| 2006/0186123 | A1 | | 8/2006 | Baltz et al. |
| 2006/0201212 | A1 | * | 9/2006 | Zollinger ............... E21B 33/00 70/164 |
| 2010/0147853 | A1 | * | 6/2010 | Hackett ................ B65D 7/16 220/315 |
| 2012/0198895 | A1 | * | 8/2012 | De Maria ............. A47G 29/10 70/63 |
| 2013/0099641 | A1 | * | 4/2013 | Saucier ................ A47G 29/10 312/237 |
| 2017/0113856 | A1 | | 4/2017 | Hollis et al. |

OTHER PUBLICATIONS

"Model No. 498A—Latch Tight™ Portable Group Lock Box," 2019 Master Lock Company LLC., 3 pages. Internet URL: https://www.mastelock.com/business-use/product/498A [retrieved on May 16, 2019].

* cited by examiner

GROUP LOCK BOX WITH RECESSED DOOR TO CREATE A SLIM PROFILE

CROSS-REFERENCE TO RELATED APPLICATION

Not applicable.

FIELD OF INVENTION

This disclosure relates to group lock boxes.

BACKGROUND

When maintaining or repairing industrial equipment, workers utilize lock out/tag out (LOTO) devices to isolate and secure one or more energy control points. Energy control points of concern (for example, a valve, a circuit breaker, or so forth) are shut off or de-energized and LOTO devices are placed on the energy control points in order to prevent those energy control points from being turned back on or re-energized while the equipment is being worked upon. After all the work is done, the LOTO devices are removed from the energy control points and the energy control points may be turned back on or re-energized.

When multiple workers are working concurrently with one another, a group lock box can be used to ensure that LOTO devices are only removed after all workers have completed their work. When using a group lock box, the LOTO devices are used to secure the energy isolation points and the keys for the LOTO devices are collectively received in the group lockout box. The group lock box itself is uniquely adapted to be lockable using multiple separate locks (for example, by having multiple openings on the body of the box and the door of the box). Each worker applies their own lock to the group lock box such that the keys to the LOTO devices received in the group lock box cannot be retrieved until all of the unique worker locks are removed from the group lock box. In this way, the secured energy control points cannot be reactivated until every worker has removed his or her lock from the group lock box.

SUMMARY

Many conventional group lock boxes are designed such that, when multiple worker locks are attached to box, the box can become unwieldly and/or have an undesirable profile. In many instances, the box becomes significantly heavier on the side of the box on which the locks are received. This makes the box more prone to tip and, as the handle is typically centered on the top of the box, makes the box more awkward to carry when the multiple locks modify the center of gravity of the box. The attachment of the worker locks can also result in the box with locks having a much wider profile than that box without the worker locks attached. This increase in the width of the box can also create issues with carrying the box (as the box is now slightly wider) or, in wall-mount situations, the box plus locks may jut out further from the surface of the wall.

Disclosed herein is a group lock out box configured to allow for, among other things, a reduced width of the group lock out box and a more centralized positioning of the worker locks during use, thereby providing a more desirable profile and an increased ease of carrying.

According to one aspect, a group lock box is disclosed. The group lock box comprises a box body and a door. The box body includes a base wall with side walls extending therefrom to define an opening thereof and an internal volume therein. The side walls of the box body have a plurality of box body lock holes. The door is connected to and movable relative to the box body between an opened position and a closed position to selectively cover the opening of the box body. The door has a plurality of door lock holes in which the plurality of door lock holes are placed into alignment with the plurality of box body lock holes when the door is placed in the closed position such that lock members are receivable through corresponding sets of lock holes including at least one of the plurality of box body lock holes and at least one of the plurality of door lock holes. The door is shaped to include a recess that extends into the internal volume of the box body.

In some instances, the recess may define an external volume on a side of the door opposite a side of the door facing the internal volume of the box body. When the door is in the closed position, the external volume of the recess of the door resides at least partly in a space of the interior volume of the box body.

In some forms, the group lock box may be adapted for secured storage of one or more keys in the group lock box.

It is further contemplated that the plurality of box body lock holes and the plurality of door lock holes may be adapted to receive a plurality of lock members therein. The recess of the door may be sized to receive at least a portion of the plurality of lock members therein, thereby reducing an overall profile of the group lock box and situating the plurality of lock members closer to a center of gravity of the group lock box.

In some forms, the plurality of box body lock holes may be disposed proximate a peripheral edge defining the opening of the box body and wherein the plurality of door lock holes are disposed proximate a peripheral edge of the door.

In some other forms, the door may be hingedly connected to the box body. A bottom edge proximate a hinge of the door and the side walls may have interdigitating projections to inhibit passage of thin items therepast.

In some instances, the side walls of the box may include an internally-extending lip on their lateral sides which, when the door is in the closed position, abuts the lateral sides of the recess of the door to inhibit passage of thin items therepast.

In some other instances, a hinge of the door may be defined by a pair of axial projections on opposing edges of the door in which the pair of axial projections are received in a pair of corresponding slots formed in the side walls of the box body.

In some forms, the base wall may be a rear wall and the side walls may include a top wall, a bottom wall, a left wall, and a right wall all extending forwardly from the rear wall such that the opening is forwardly facing.

It is contemplated that the box body may be steel. The door may be a clear polycarbonate. The box body may be a single piece of metal that is bent to form the volume.

In some instances, the group lock box may further include a handle attached to at least one of the side walls. The handle may be adapted for carrying the group lock box.

In some forms, the base wall may include a mounting opening for attaching the base wall to a vertical mounting surface. The door may include a key slot formed therein to permit keys to be placed into the interior volume when the door is in the closed position relative to the box body.

It is further contemplated that the group lock box may further comprise lock storage support members in the interior volume of the box body that are connected to the box body. The lock storage support members may be posts extending forwardly from the rear wall and sized to be of a length corresponding to a distance between the base wall and an interior surface of the recess of the door when the door is in the closed position.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Referring to FIGS. 1-6, a group lock box 10 comprises a box body 12 with a handle 14 on a top side thereof and a door 16 hinged thereto. As will be described in detail below, the group lock box 10 is movable between an opened position shown in FIG. 2 in which the door 16 is swung open with respect to the box body 12 and a closed position shown in FIG. 1 in which the door 16 is swung shut. The group lock box 10 is further configured to be selectively locked by unique user locks in the closed position to secure keys for lock out/tag out (LOTO) devices therein. After all workers have completed their work and all of them have removed their unique user locks, then the door 16 may again be opened to provide access to the keys in the group lock box 10.

Figure 4:
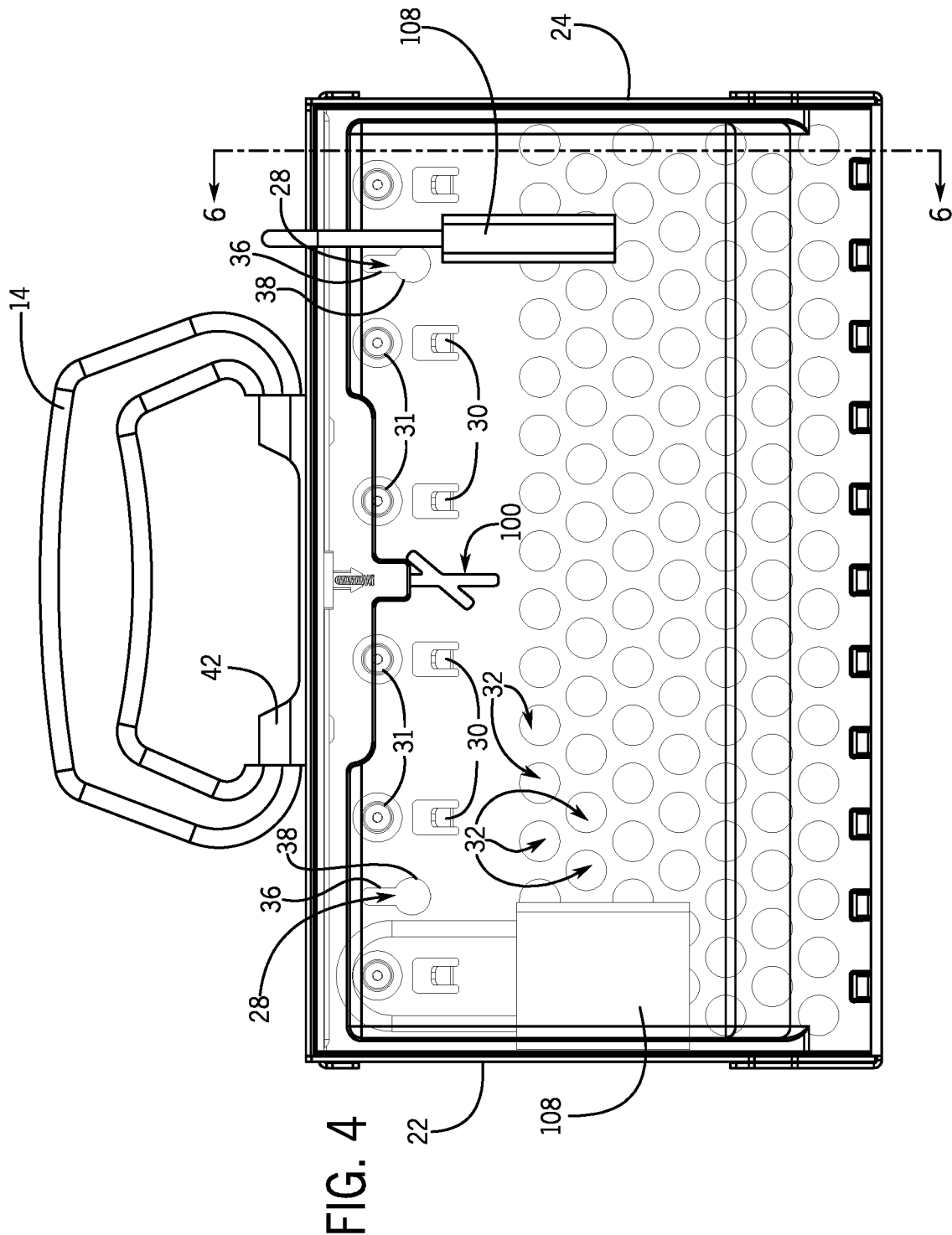
FIG. 4 is a front plan view of FIG. 3.
Figure 5:
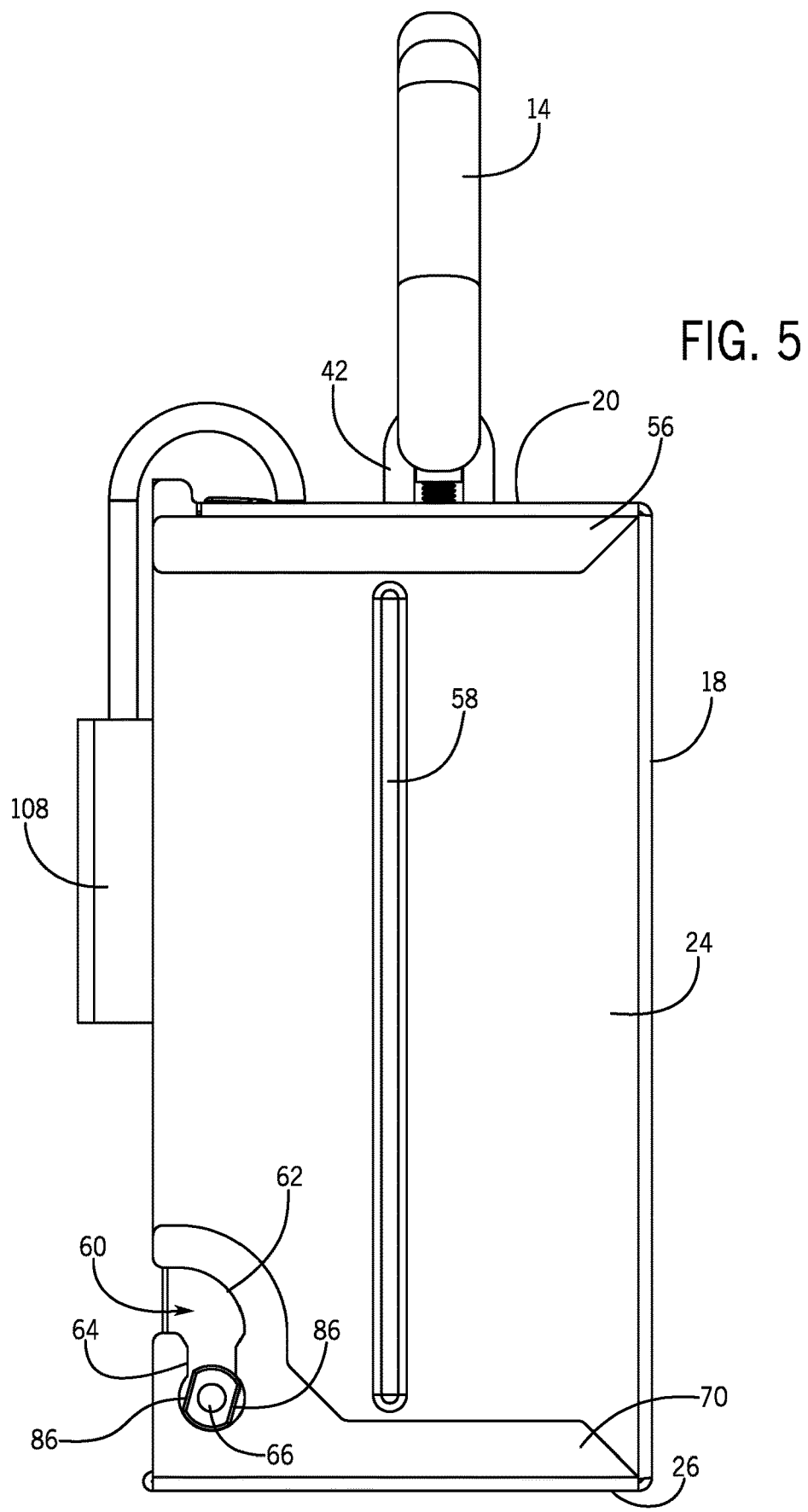
FIG. 5 is a right side view of the box of FIG. 3.
Figure 6:
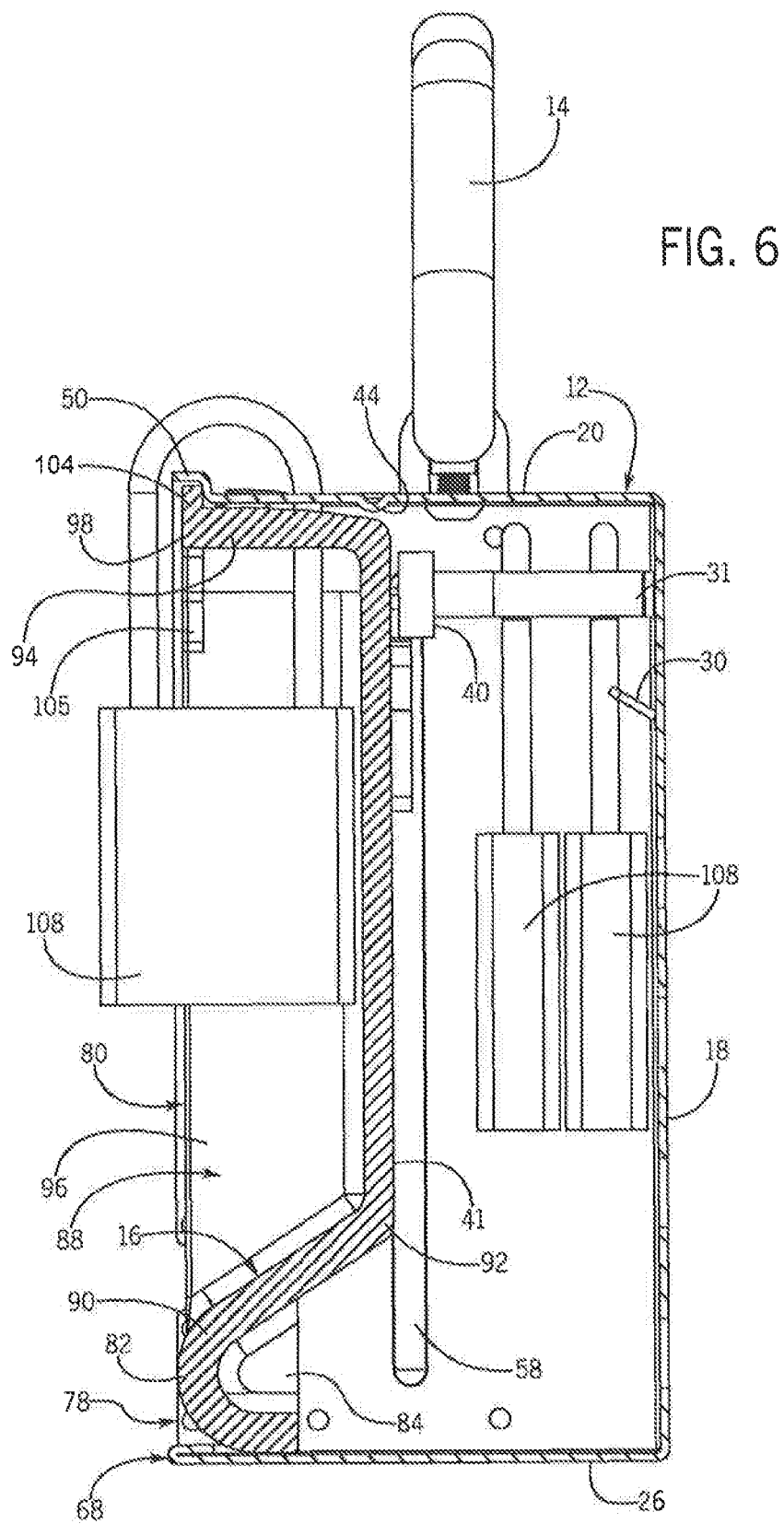
FIG. 6 is a cross-sectional right side view of the box of FIG. 3 taken though line 6-6 in FIG. 4.

The box body 12 comprises a rear or base wall 18 (numbered in FIGS. 5 and 6) and side walls including a top wall 20, a left wall 22 (numbered in FIGS. 2 and 4), a right wall 24, and a bottom wall 26 (numbered in FIGS. 5 and 6). These side walls 20, 22, 24, 26 each extend forwardly from the base wall 18, thereby defining an opening and an internal volume of the box body 12. In some instances, the box body 12 may comprise a single piece of metal in which the side walls are bent forwardly from the base wall 18 and joined at seams therebetween to form the internal volume. While a typical material for the box body 12 will be steel, it is contemplated that the box body 12 could be formed of other metals (for example, aluminum), plastics, or any other suitable metallic material and may be formed in any number of ways (for example, by welding, molding, riveting, and so forth).

As best illustrated in FIG. 4, the base wall 18 comprises a plurality of mounting openings 28, a plurality of hook features 30, a plurality of lock storage support members 31, and a plurality of material reduction apertures 32.

The plurality of mounting openings 28 are disposed proximate an upper end of the base wall 18. The mounting openings 28 can be used to attach the base wall 18 to a vertical mounting surface, such as, for example, a wall or other support structure.

In the illustrated non-limiting example, there are two mounting openings 28. It is contemplated that in other non-limiting examples, there may be more or less than two mounting openings 28, as desired for a given situation. For example, in some instances, the base wall 18 may include a single, centralized mounting opening. In some other instances, the base wall 18 may include three or four mounting openings to provide increased stabilization when the base wall 18 is mounted to the vertical mounting surface.

The mounting openings 28 each include an elongated upper portion 36 and an enlarged lower portion 38. As such, a fastener having a fastener head and attached to the vertical mounting surface may be fed through the enlarged lower portion 38 and subsequently slid into the elongated upper portion 36 to hang or mount the base wall 18 onto the vertical mounting surface.

Looking now at the hook features 30, the plurality of hook features 30 are disposed proximate the upper end of the base wall 18. In the illustrated form, each of the hook features 30 is unitary with the base wall 18, but is bent forwardly, extending into the internal volume of the box body 12 to provide the hook-like features; however, it is contemplated that hooks could be formed in other ways and could be a separate structure attached to a rear wall or side walls of the box body. The hook features 30 can be used to hang and sort various lock keys, as will be described below.

In the illustrated non-limiting example, there are six hook features 30. The hook features 30 are also both laterally and evenly spaced on the base wall 18. In some non-limiting examples, there may be more or less than six hook features 30, as necessary for a given situation. Similarly, in some non-limiting examples, the hook features 30 may be vertically and/or unevenly spaced on the base wall 18.

In the form illustrated, the base wall 18 also supports the plurality of lock storage support members 31 which are disposed proximate the upper end of the base wall 18. As best illustrated in FIG. 6, the lock storage support members 31 are coupled to the base wall 18. Each of the lock storage support members 31 has a cylindrical rod-like element or post and includes a stopper 40. Each of the lock storage support members 31 are further sized to be of a length corresponding to a distance between the base wall 18 and an interior surface 41 (shown in FIG. 6) of the door 16 when the door 16 is in the closed position which can help prevent any locks supported thereon from falling off the lock storage support members 31 if the box 10 is moved using, for example, the handle 14.

In the illustrated non-limiting example, there are six lock storage support members 31, each generally located proximate a corresponding one of the hook features 30. Accordingly, the lock storage support members 31 are both laterally and evenly spaced on the base wall 18. Again, in some non-limiting examples, there may be more or less than six lock storage support members 31, as necessary for a given situation or box design or size. Similarly, in some non-limiting examples, the lock storage support members 31 may be vertically and/or unevenly spaced on the base wall 18.

Finally with respect to the base wall 18, the plurality of material reduction apertures 32 are disposed in offset rows clustered toward a lower end of the base wall 18. The plurality of material reduction apertures 32 may be included to reduce the overall weight of the box body 12 and/or help to balance the weight of the box 10, especially if the door 16 is made of a lighter weight polymeric material in comparison to the box body 12. The apertures 32 would be sized so as not to be so large as to permit objects stored in the box 10 (for example, keys) to be removed through the apertures 32. In some instances, the base wall 18 may alternatively not include the material reduction apertures 32.

Figure 1:
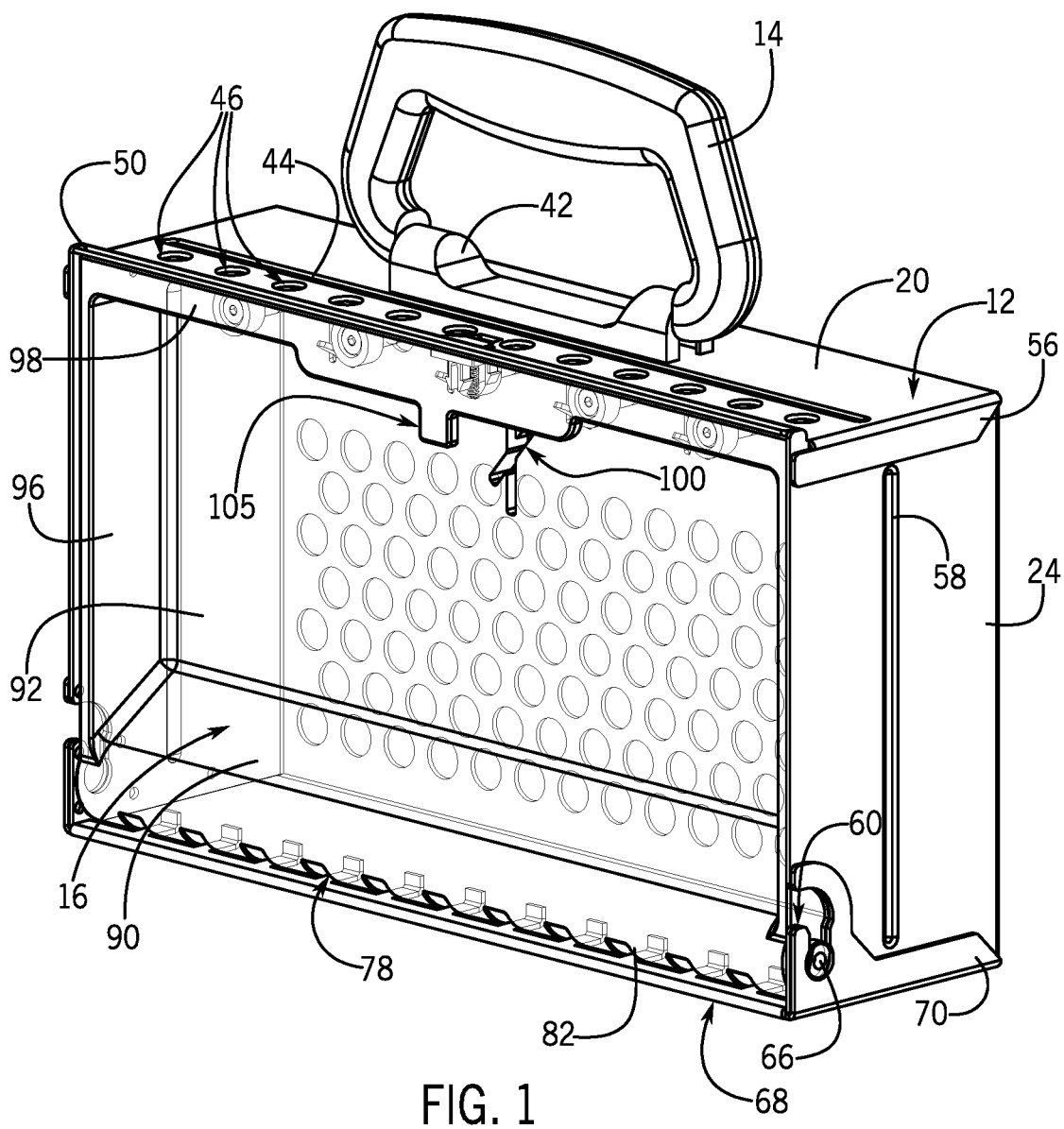
FIG. 1 is a perspective view showing the top, front and side of a group lockout box with its door in a closed position.

As best illustrated in FIGS. 1 and 6, the top wall 20 includes a handle attachment feature 42, an internally-extending lip 44, a plurality of box body lock holes 46, a closure mechanism aperture 48 (shown in FIG. 2), and a door-receiving flange 50.

The handle attachment feature 42 is centrally disposed on the top wall 20 and is configured to hingedly couple the handle 14 to the top wall 20 of the box body 12. The handle 14 is thus adapted for carrying the group lock box 10.

The internally-extending lip 44 is disposed forward of and adjacent the handle attachment feature 42. The internally-extending lip 44 extends internally with respect to the internal volume defined within the box body 12. The internally-extending lip 44 further extends laterally across the top wall 20, from proximate a right end of the top wall 20 to proximate a left end of the top wall 20. When this lip 44 abuts or interacts with the door 16, it can prevent stored objects, such as keys, from within the volume of the box 10 from sliding out between the box body 12 and the door 16.

Forward of the lip 44 and proximate a front end of the peripheral edge of the top wall 20 defining a part of the opening of the box body 12 are the plurality of box body lock holes 46. In the illustrated non-limiting example, there are twelve box body lock holes 46. The box body lock holes 46 are also both laterally and evenly spaced across the top wall 20. In other non-limiting examples, there can be more or less than twelve box body lock holes 46, as necessary for a given situation. Additionally, the box body lock holes 46 may be unevenly spaced across the top wall 20. As will be discussed in detail below, these lock holes 46 can be paired with lock holes on the door 16 and used to secure the door 16 shut.

Figure 2:
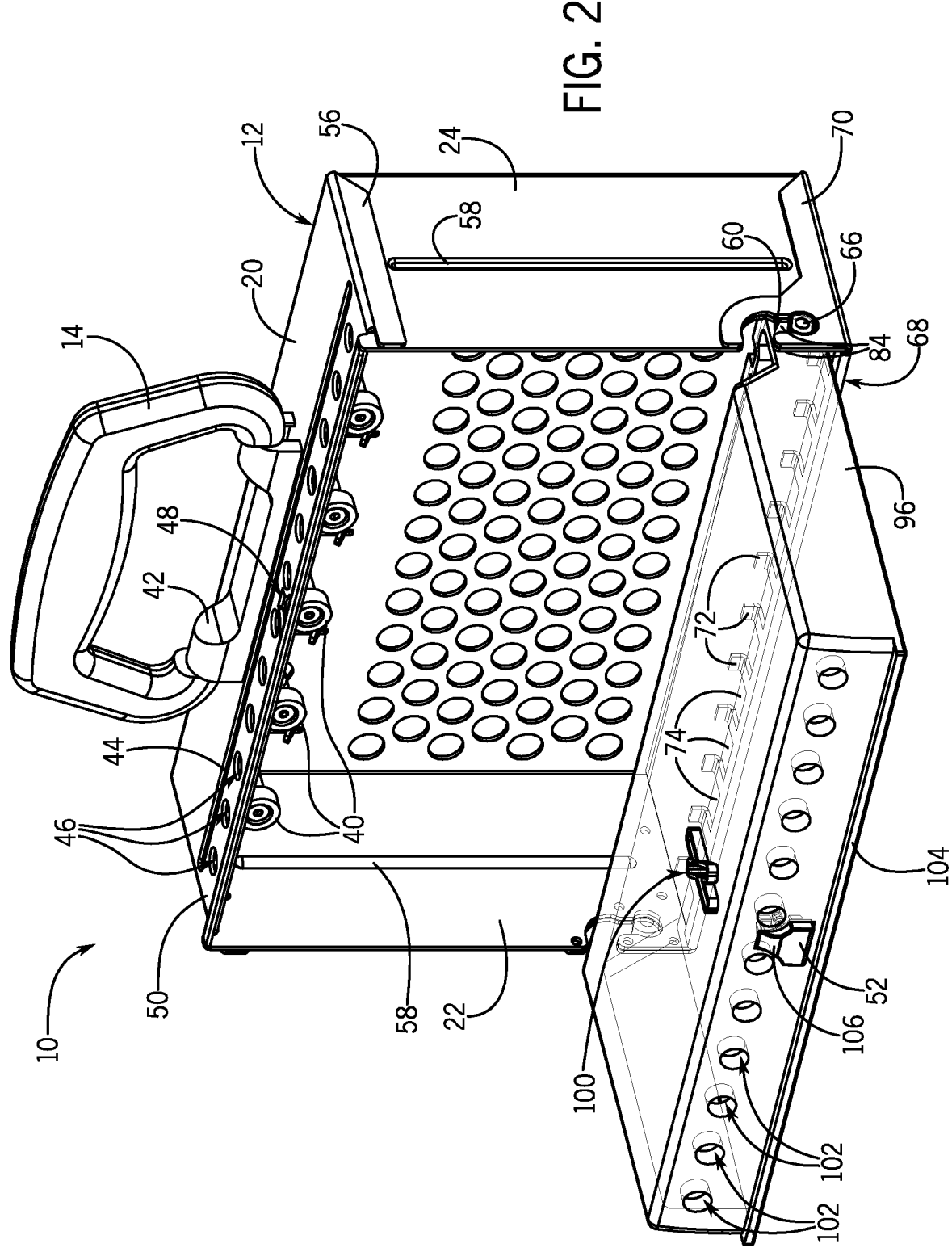
FIG. 2 is a perspective view of the group lockout box of FIG. 1 with its door in an opened position.

As best shown in FIG. 2, the top wall 20 also has the closure mechanism aperture 48 is centrally disposed thereon, proximate the front end of the top wall 20. The closure mechanism aperture 48 is configured to receive a closure mechanism 52 on the door 16 and is configured to selectively retain group lock box 10 in the closed position regardless of whether the door 16 is locked to the box body 12, as will be described below.

Also at the front end of the top wall 20 is the door-receiving flange 50. The door-receiving flange 50 is configured to contact a stopper lip 104 of the door 16 (as best shown in FIG. 6), thereby inhibiting the door 16 from hingedly rotating past the closed position, as will be described in greater detail below.

The top wall 20 further includes a pair of side wall engaging portions 56. The side wall engaging portions 56 are disposed on opposing ends (i.e., the right end and left end) of the top wall 20. The side wall engaging portions 56 extend downward from the top wall 20 and are each configured to be coupled to a corresponding one of the left wall 22 and the right wall 24.

Turning now to the left wall 22 and the right wall 24, these walls extend forwardly from a left end and a right end of the base wall 18, respectively. Each of the left and right walls 22 and 24 include an internally-extending lip 58, similar to the internally-extending lip 44, and a hinge slot 60 at a lower, forward end of the respective wall. The internally-extending lips 58 are central disposed on the corresponding side walls 22, 24. The internally-extending lips 58 extend internally with respect to the internal volume defined within the box body 12. Each of the internally-extending lips 58 further extends vertically along the corresponding side wall 22, 24, from proximate a top end of the corresponding side wall 22, 24 to proximate a bottom end of the corresponding side wall 22, 24.

The hinge slots 60 at the lower end of the corresponding side wall 22, 24 are configured to receive a pair of axial projections 66 of the door 16. As best illustrated in FIG. 5, each of the hinge slots 60 include an entry portion 62 and a narrow portion 64. As described below, the entry portions 62 are sized to permit the insertion of the axial projections 66 into the hinge slots 60 and the narrow portions 64 are sized to selectively retain the axial projections 66 within the hinge slots 60.

As best illustrated in FIGS. 2 and 6, the bottom wall 26 extends forwardly from a bottom end of the base wall 18. The bottom wall 26 includes a door-engaging fold-over portion 68 and a pair of side wall engaging portions 70.

The door-engaging fold-over portion 68 is disposed at a front end of the bottom wall 26. The door-engaging fold-over portion 68 is a portion of the bottom wall 26 that is folded over on itself to create a double-layered portion of the bottom wall 26. The door-engaging fold-over portion 68 further includes a plurality of projections 72 separated by a plurality of notches 74. The plurality of projections 72 extend upward from the bottom wall 26, and are sized to slidably engage and interdigitate with corresponding slots 76 (shown in FIG. 3) of the door 16. The plurality of notches 74 are disposed between the plurality of projections 72 and are configured to permit rotation of the door 16 while inhibiting the passage of thin items (e.g., keys) therepast.

The bottom wall 26 also has a pair of side wall engaging portions 70 that are disposed on opposing ends (i.e., the right end and left end) of the bottom wall 26. The side wall engaging portions 70 extend upward from the bottom wall 26 and are each configured to be coupled (e.g., by spot welding) to a corresponding one of the left wall 22 and the right wall 24. As shown, a portion of each of the pair of side wall engaging portions 70 may be shaped to correspond to the hinge slots 60 of the side walls 22, 24.

As described above, the door 16 is hingedly coupled to the box body 12. Accordingly, the door 16 is connected to and movable relative to the box body 12 between the opened position and the closed position to selectively cover the opening of the box body 12. In some instances, the door 16 comprises a polymeric material, such as, for example, a polycarbonate material. In some instances, the polycarbonate may comprise a clear or partially clear polycarbonate material.

As best illustrated in FIG. 6, the door 16 includes a lower hinge portion 78 for coupling the door 16 to the box body 12 and an upper recess portion 80. The lower hinge portion 78 includes a rounded lower wall 82 and a pair of opposed side walls 84. The rounded lower wall 82 includes the aforementioned slots 76 that are configured to mesh or interdigitate with the projections 72 of the bottom wall 26. The pair of opposed side walls 84 extend both rearward and toward the upper recess portion 80 from the lower hinge portion 78. Each of the pair of opposed side walls 84 includes a corresponding one of the axial projections 66.

As best illustrated in FIG. 5, the axial projections 66 comprise a rod having opposing flats 86. Each axial projection has a flat-to-flat distance (i.e., the distance from one flat 86 to the other flat 86) that corresponds to the narrow portion 64 of the hinge slots 60. As such, the axial projections 66 can be inserted through the narrow portions 64 in a predetermined rotational orientation. The axial projections 66 can then be retained within the hinge slots 60 until returned to the predetermined rotational orientation.

Referring again to FIG. 6, most notably, the upper recess portion 80 includes a recess 88 defining an external volume on a side of the door 16 opposite a side of the door 16 facing the internal volume of the box body 12. The recess 88 is formed by an angled lower wall 90, a recessed wall 92, an upper wall 94 and a pair of upper side walls 96. The angled lower wall 90 extends from the rounded lower wall 82 of the lower hinge portion 78, both upward and rearward toward the recessed wall 92. The recessed wall 92 extends upward from the angled lower wall 90, toward the upper wall 94. The upper wall 94 extends forward, terminating at a front end 98. The pair of upper side walls 96 extends, at opposing sides of the upper recess portion 80, between the angled lower wall 90, the recessed wall 92, and the upper wall 94.

The recessed wall 92 includes a key slot 100 formed therein to permit keys to be placed into the interior volume when the door 16 is in the closed position relative to the box body 12.

The upper wall 94 of the door 16 also includes a plurality of door lock holes 102 (shown in FIG. 2), the closure mechanism 52, the stopper lip 104, and a central gripping portion 105.

As best shown in FIG. 2, the plurality of door lock holes 102 are disposed proximate a peripheral edge of the door 16 and will correspond to and align with the plurality of box body lock holes 46 of the box body 12 described above when the door 16 is in the closed position. In the illustrated non-limiting example, there are twelve door lock holes 102 that are both laterally and evenly spaced across the upper wall 94 of the door 16. In other non-limiting examples, there can be more or less than twelve door lock holes 102, as necessary for a given situation and corresponding box body 12. It is further contemplated that, in some forms, the door lock holes may be unevenly spaced so long as they align with the lock holes of the box body in the closed position of the door.

Even without the locks on the lock holes, the door 16 can be temporarily held or retained in the closed position by the closure mechanism 52. The closure mechanism 52 is an upwardly-biased button-like feature that can be upwardly biased, for example, by a spring or any other suitable biasing element. The closure mechanism 52 is configured to engage the closure mechanism aperture 48 of the box body 12, and further includes a ramp 106 at a rear end of the closure mechanism 52. The ramp 106 allows for the closure mechanism 52 to be temporarily moved downward while the door 16 is moved into the closed position, as will be described below, and to be depressed to disengage or free the top edge of the door 16 from the box body 12 to permit the door 16 to be opened.

The top edge of the door 16 also includes a stopper lip 104. The stopper lip 104 extends both upward from the upper wall 94 and laterally across the upper wall 94 from the right end of the upper wall 94 to the left end of the upper wall 94. The stopper lip 104 is configured to contact the door-receiving flange 50 of the box body 12 to prevent the door 16 from being rotated past the closed position (that is, it prevents over-rotation of the door into the volume of the box body).

The door 16 also includes a central gripping portion 105 that extends downward from the upper wall 94 proximate the center of the front end 98 of the upper wall 94. The central gripping portion 105 is configured to provide a gripping point or door pull for moving or manipulating the door 16 between the opened and closed positions.

Now that the general structure of the group lock box 10 has been described above, an exemplary method of use will be described below. It will be understood that the following method of use is provided as an example, and is in no way meant to be limiting.

As referenced above, when multiple workers are working concurrently with one another, the group lock box 10 can be used to ensure that LOTO devices are only removed after all workers have completed their work.

Figure 3:
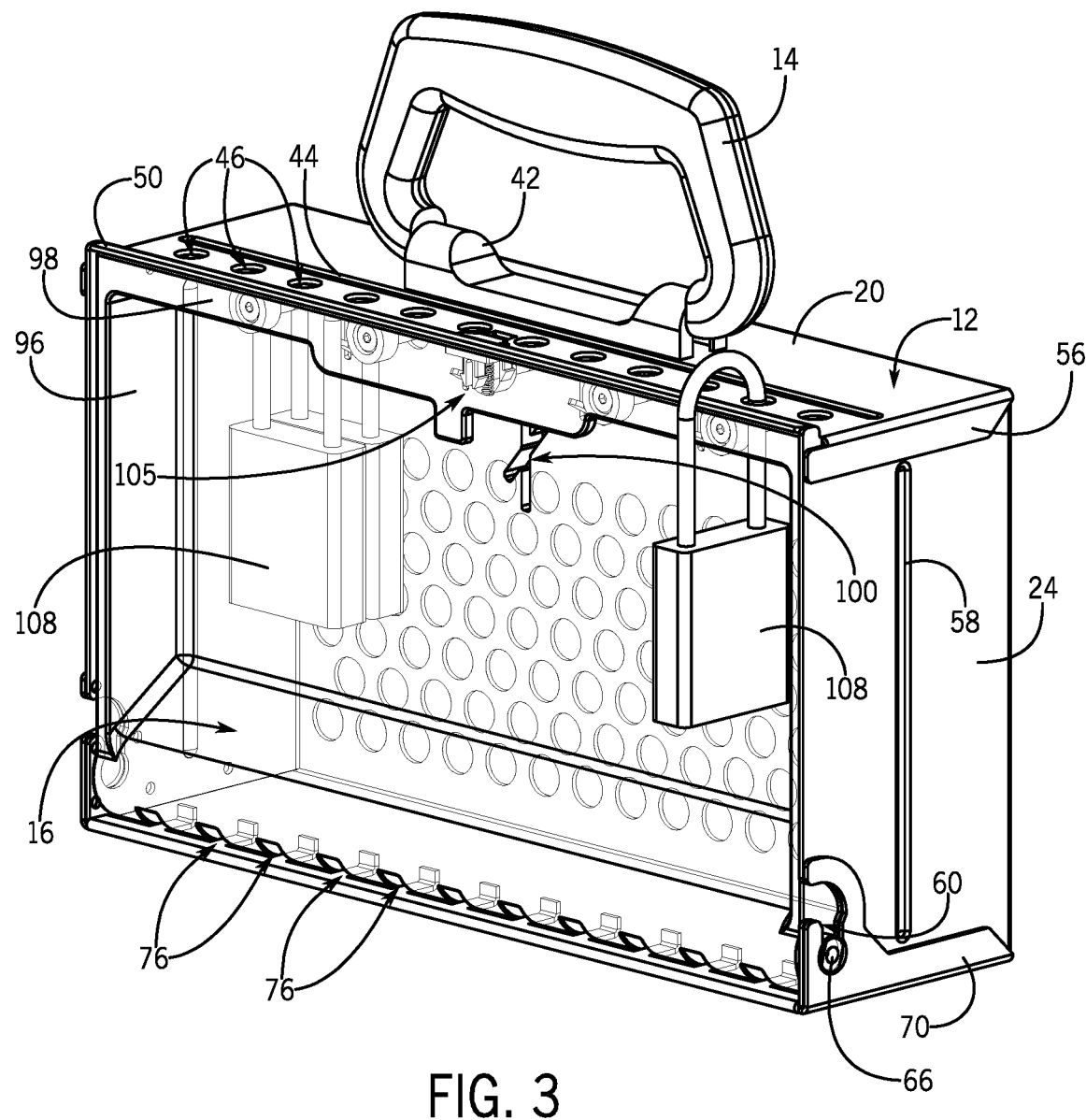
FIG. 3 is a perspective view of the group lockout box of FIG. 1, with locks shown stored inside it as well as the box secured shut.

Specifically, the group lock box 10 can initially be in the closed position, and can be used to store multiple separate locks 108. The multiple separate locks 108 can be stored on the lock storage support members 31 within the internal volume of the box body 12, as shown in FIG. 3.

During use, the group lock box 10 may be opened by opening the door 16 relative to the box body 12, and the multiple separate locks 108 may be removed which are typically used to isolate energy controls on equipment being worked upon, but which could also be unique user locks that will be subsequently used to secure or lock the box 10. The group lock box 10 may then be closed. As the door 16 closes, the ramp 106 of the closure mechanism 52 can be forced downward by the top wall 20 of the box body 12. The closure mechanism 52, due to the upward biasing of the spring or other biasing element, can then pop up into the closure mechanism aperture 48 when the door 16 is fully closed, thereby selectively retaining the group lock box 10 in the closed position.

With the group lock box 10 in the closed position, the multiple workers may use various LOTO devices to secure various energy isolation points. Keys (not shown) for the LOTO devices may then be collectively received in the group lock box 10, by inserting the keys through the key slot 100 on the recessed wall 92 of the door 16 or, alternatively before the door 16 is closed and locked, by simply placing the keys in the inter volume of the box 10.

It should be appreciated that, when the group lock box 10 is in the closed position, the internally-extending lips 44, 58 of the top wall 20, the left wall 22, and the right wall 24 and the door-engaging fold-over portion 68 of the bottom wall 26 are configured to inhibit the passage of thin items, such as the keys, between any of the side walls 20, 22, 24, 26 and the door 16.

As noted above, the group lock box 10 is uniquely adapted to be lockable using multiple separate and unique locks 108 once the door 16 is closed. More specifically, in the closed position, the plurality of box body lock holes 46 are placed into alignment with the plurality of door lock holes 102, such that the multiple locks 108 (each unique to a distinct worker) are receivable through the corresponding sets of lock holes 46, 102. Thus, before, during, or after inserting the keys through the key slot 100, each of the multiple workers may take their own one of the locks 108 and apply it to a corresponding set of lock holes 46, 102. As such, with the various locks 108 applied to the group lock box 10, the keys to the LOTO devices received in the group lock box 10 cannot be retrieved until all of the unique worker locks 108 are removed from the group lock box 10. In this way, the secured energy control points cannot be reactivated until each and every worker has removed his or her lock 108 from the group lock box 10.

Notably, it should be appreciated that, when the door 16 is in the closed position, and the locks 108 are applied to the various sets of lock holes 46, 102, the recess 88 extends into the internal volume of the box body 12, such that the external volume of the recess 88 resides at least partly in a space of the internal volume of the box body 12. The recess 88 is further sized to receive at least a portion of the multiple separate locks 108 therein, thereby reducing an overall profile of the group lock box and situating the plurality of lock members closer to a center of gravity of the group lock box.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A group lock box comprising:
a box body including a base wall with side walls extending therefrom to define an opening thereof and an internal volume therein, wherein the side walls of the box body have a plurality of box body lock holes; and
a door connected to and movable relative to the box body between an opened position and a closed position to selectively cover the opening of the box body, wherein the door has a plurality of door lock holes in which the plurality of door lock holes are placed into alignment with the plurality of box body lock holes when the door is placed in the closed position such that lock members are receivable through corresponding sets of lock holes including at least one of the plurality of box body lock holes and at least one of the plurality of door lock holes;
wherein the door is shaped to include a recess that extends into the internal volume of the box body and wherein, when the door is placed in the closed position and at least a corresponding one of the lock members is received through a corresponding one of the sets of lock holes, the recess is dimensioned to receive at least a portion of lock member bodies therein thereby reducing an overall profile of the group lock box and situating the plurality of lock members closer to a center of gravity of the group lock box.

2. The group lock box of claim 1, wherein the recess defines an external volume on a side of the door opposite a side of the door facing the internal volume of the box body and wherein, when the door is in the closed position, the external volume of the recess of the door resides at least partly in a space of the internal volume of the box body.

3. The group lock box of claim 1, wherein the group lock box is adapted for secured storage of one or more keys in the group lock box.

4. The group lock box of claim 1, wherein the plurality of box body lock holes and the plurality of door lock holes are adapted to receive a plurality of lock members therein.

5. The group lock box of claim 1, wherein the plurality of box body lock holes are disposed proximate a peripheral edge defining the opening of the box body and wherein the plurality of door lock holes are disposed proximate a peripheral edge of the door.

6. The group lock box of claim 1, wherein the door is hingedly connected to the box body.

7. The group lock box of claim 6, wherein a bottom edge of the door and the side walls of the box body at a hinge therebetween have interdigitating projections and slots to inhibit passage of thin items therepast.

8. The group lock box of claim 1, wherein the side walls of the box body include an internally-extending lip which, when the door is in the closed position, abuts the sides of the recess of the door to inhibit passage of thin items therepast.

9. The group lock box of claim 1, wherein a hinge of the door is defined by a pair of axial projections on opposing edges of the door in which the pair of axial projections are received in a pair of corresponding slots formed in the side walls of the box body.

10. The group lock box of claim 1, wherein the base wall is a rear wall and the side walls include a top wall, a bottom wall, a left wall, and a right wall which all extending forwardly from the rear wall such that the opening is forwardly facing.

11. The group lock box of claim 1, wherein the box body is steel.

12. The group lock box of claim 1, wherein the door is a clear polycarbonate.

13. The group lock box of claim 1, wherein the box body is a single piece of metal that is bent to form the internal volume.

14. The group lock box of claim 1, wherein the group lock box further includes a handle attached to at least one of the side walls, the handle adapted for carrying the group lock box.

15. The group lock box of claim 1, wherein the base wall includes a mounting opening for attaching the base wall to a vertical mounting surface.

16. The group lock box of claim 1, wherein the door includes a key slot formed therein to permit keys to be placed into the internal volume when the door is in the closed position relative to the box body.

17. The group lock box of claim 1, further comprising lock storage support members in the internal volume of the box body that are connected to the box body.

18. The group lock box of claim 17, wherein the lock storage support members are posts extending forwardly from the base wall and sized to be of a length corresponding to a distance between the base wall and an interior surface of the recess of the door when the door is in the closed position.

19. The group lock box of claim 1, wherein the base wall includes a plurality of material reduction apertures configured to reduce material weight of the group lock box.

* * * * *